US012610884B2

(12) United States Patent
Hilgart et al.

(10) Patent No.: US 12,610,884 B2
(45) Date of Patent: Apr. 28, 2026

(54) BAFFLES FOR MOWER DECK

(71) Applicant: Clark Equipment Company, West Fargo, ND (US)

(72) Inventors: Randy Hilgart, Cottage Grove, WI (US); Mark J. Wegner, Watertown, WI (US); Jeff Zur, Lodi, WI (US); Anthony S. Weber, Lake Mills, WI (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 945 days.

(21) Appl. No.: 17/590,236

(22) Filed: Feb. 1, 2022

(65) Prior Publication Data

US 2022/0394918 A1      Dec. 15, 2022

Related U.S. Application Data

(62) Division of application No. 16/171,713, filed on Oct. 26, 2018, now Pat. No. 11,234,365.

(Continued)

(51) Int. Cl.
*A01D 34/66*          (2006.01)
*A01D 34/71*          (2006.01)
*A01D 101/00*          (2006.01)

(52) U.S. Cl.
CPC ............. *A01D 34/71* (2013.01); *A01D 34/66* (2013.01); *A01D 34/661* (2013.01); *A01D 2101/00* (2013.01)

(58) Field of Classification Search
CPC .............. A01D 2101/00; A01D 34/005; A01D 34/685; A01D 34/81; A01D 34/71; A01D 34/66; A01D 34/661
See application file for complete search history.

(56) References Cited

U.S. PATENT DOCUMENTS 2,711,624 A      6/1955   Crump
2,898,723 A      8/1959   Goodall
(Continued)

FOREIGN PATENT DOCUMENTS

DE          29512057 U1    11/1995
FR           2643213 A1     8/1990
(Continued)

OTHER PUBLICATIONS

Installation Instruction Sheet for Ransomes Baffle Kit No. 970115.
(Continued)

*Primary Examiner* — Adam J Behrens
(74) *Attorney, Agent, or Firm* — PANITCH SCHWARZE BELISARIO & NADEL LLP

(57) ABSTRACT

A mower deck includes a top deck, a front wall, a rear wall opposite the front wall and a first side wall. The first side wall extends between the front and rear walls. A front baffle assembly extends downwardly from the top deck. The front baffle assembly extends from the first side wall toward a discharge opening that is positioned between the front and rear walls at a discharge side of the top deck. The front baffle assembly is configured to urge cut grass and debris toward the discharge opening. A discharge baffle is positioned proximate a rear end of the discharge opening and extends downwardly from the top deck. The discharge baffle and the rear wall define a discharge gap. The discharge gap is positioned on an opposite side of the discharge baffle from the discharge opening. The discharge gap is configured to allow airflow into the mower deck.

9 Claims, 10 Drawing Sheets

Related U.S. Application Data

(60) Provisional application No. 62/579,351, filed on Oct. 31, 2017.

(56) References Cited

U.S. PATENT DOCUMENTS

| | | | |
|---|---|---|---|
| 3,283,486 A | 11/1966 | Marek | |
| 3,469,376 A | 9/1969 | Bacon | |
| 3,485,018 A | 12/1969 | Beckering | |
| 3,680,292 A | 8/1972 | McCanse | |
| 3,795,094 A | 3/1974 | Mollen et al. | |
| 3,916,606 A | 11/1975 | Brudnak, Jr. et al. | |
| 4,055,036 A | 10/1977 | Kidd | |
| 4,114,353 A | 9/1978 | Ansbaugh et al. | |
| 4,154,455 A | 5/1979 | Murphy | |
| 4,226,074 A | 10/1980 | Mullet et al. | |
| 4,318,268 A | 3/1982 | Szymanis | |
| 4,364,221 A | 12/1982 | Wixom | |
| 4,532,755 A | 8/1985 | Schemelin et al. | |
| 4,543,773 A | 10/1985 | Reilly | |
| 4,779,406 A | 10/1988 | Schroeder | |
| 4,787,195 A | 11/1988 | Wenzel | |
| D305,336 S | 1/1990 | Berg et al. | |
| 4,897,987 A | 2/1990 | Spalla et al. | |
| 4,916,887 A | 4/1990 | Mullet et al. | |
| 4,930,298 A * | 6/1990 | Zenner | A01D 34/81 |
| | | | 56/320.1 |
| 4,938,011 A | 7/1990 | Pernia | |
| 4,958,484 A | 9/1990 | Busboom | |
| 4,967,543 A | 11/1990 | Scag et al. | |
| 4,991,382 A | 2/1991 | Scag | |
| 4,998,948 A | 3/1991 | Osterling | |
| 5,035,108 A | 7/1991 | Meyer et al. | |
| 5,042,239 A | 8/1991 | Card | |
| 5,090,183 A | 2/1992 | Thorud et al. | |
| 5,129,217 A | 7/1992 | Loehr | |
| 5,133,176 A | 7/1992 | Baumann et al. | |
| 5,155,985 A | 10/1992 | Oshima et al. | |
| 5,191,756 A | 3/1993 | Kuhn | |
| 5,205,112 A | 4/1993 | Tillotson et al. | |
| 5,210,998 A | 5/1993 | Hojo et al. | |
| 5,212,938 A | 5/1993 | Zenner et al. | |
| 5,239,810 A | 8/1993 | Gugel | |
| 5,249,411 A | 10/1993 | Hake | |
| 5,267,429 A | 12/1993 | Kettler et al. | |
| 5,305,589 A | 4/1994 | Rodriguez et al. | |
| 5,337,543 A | 8/1994 | Kitamura et al. | |
| 5,337,545 A | 8/1994 | Butler | |
| 5,355,661 A | 10/1994 | Tomiyama | |
| 5,404,697 A | 4/1995 | Dewey | |
| 5,457,947 A | 10/1995 | Samejima et al. | |
| 5,465,564 A | 11/1995 | Koehn et al. | |
| 5,481,857 A | 1/1996 | Umemoto et al. | |
| 5,483,790 A | 1/1996 | Kuhn et al. | |
| 5,488,821 A | 2/1996 | McCunn et al. | |
| 5,501,636 A | 3/1996 | Janke et al. | |
| 5,507,138 A | 4/1996 | Wright et al. | |
| 5,518,079 A | 5/1996 | Zvolanek | |
| 5,609,011 A | 3/1997 | Kuhn et al. | |
| 5,628,171 A | 5/1997 | Stewart et al. | |
| 5,765,346 A | 6/1998 | Benter et al. | |
| 5,791,132 A | 8/1998 | Wiedenmann | |
| 5,822,961 A | 10/1998 | Busboom | |
| 5,826,416 A | 10/1998 | Sugden et al. | |
| 5,832,708 A | 11/1998 | Sugden | |
| 5,845,475 A | 12/1998 | Busboom et al. | |
| 5,848,520 A | 12/1998 | Arfstrom et al. | |
| 5,865,018 A | 2/1999 | Wanie | |
| 5,890,354 A | 4/1999 | Bednar | |
| 5,894,717 A | 4/1999 | Yamashita et al. | |
| 5,987,863 A | 11/1999 | Busboom et al. | |
| D424,071 S | 5/2000 | Bickford et al. | |
| 6,148,595 A | 11/2000 | Rabe et al. | |
| 6,192,666 B1 | 2/2001 | Sugden et al. | |
| 6,571,544 B1 | 6/2003 | Buss et al. | |
| 6,609,358 B1 | 8/2003 | Schmidt et al. | |
| 6,619,319 B1 | 9/2003 | Horton et al. | |
| 6,631,733 B2 | 10/2003 | Horton et al. | |
| 6,681,553 B2 | 1/2004 | Ferree et al. | |
| 6,766,633 B2 | 7/2004 | Wanie et al. | |
| 6,779,328 B2 | 8/2004 | Buss et al. | |
| 6,782,684 B2 | 8/2004 | Buss et al. | |
| 6,848,246 B2 | 2/2005 | Samejima et al. | |
| 6,892,519 B2 | 5/2005 | Sugden et al. | |
| 6,951,092 B2 | 10/2005 | Busboom et al. | |
| 6,996,962 B1 | 2/2006 | Sugden et al. | |
| 7,062,898 B2 | 6/2006 | Sarver et al. | |
| 7,065,946 B2 | 6/2006 | Boeck et al. | |
| 7,093,415 B2 | 8/2006 | Kallevig et al. | |
| 7,197,863 B1 | 4/2007 | Sugden | |
| 7,237,374 B2 | 7/2007 | Sugden et al. | |
| 7,299,613 B2 | 11/2007 | Samejima et al. | |
| 7,316,286 B2 | 1/2008 | Hillary | |
| 7,360,352 B2 * | 4/2008 | Samejima | A01D 34/71 |
| | | | 56/320.1 |
| 7,373,768 B2 | 5/2008 | Sugden et al. | |
| 7,437,865 B2 | 10/2008 | Koike et al. | |
| 7,458,199 B2 | 12/2008 | Sarver et al. | |
| 7,478,689 B1 | 1/2009 | Sugden et al. | |
| D590,844 S | 4/2009 | Eavenson, Sr. et al. | |
| 7,555,887 B2 | 7/2009 | Schick et al. | |
| 7,587,886 B1 | 9/2009 | Sugden | |
| 7,617,665 B2 | 11/2009 | Yamashita et al. | |
| 7,665,286 B2 | 2/2010 | Butler et al. | |
| 7,669,395 B2 | 3/2010 | Wehler et al. | |
| 7,677,022 B2 * | 3/2010 | Chenevert | A01D 42/005 |
| | | | 56/320.1 |
| 7,685,799 B2 | 3/2010 | Samejima et al. | |
| 7,866,135 B2 * | 1/2011 | Davis | A01D 34/71 |
| | | | 56/320.2 |
| 8,047,310 B2 | 11/2011 | Kallevig | |
| 8,171,709 B1 * | 5/2012 | Bedford | A01D 34/71 |
| | | | 56/320.2 |
| 11,119,495 B2 * | 9/2021 | Uemura | G05D 1/0278 |
| 2004/0255567 A1 * | 12/2004 | Kallevig | A01D 34/005 |
| | | | 56/320.2 |
| 2007/0068132 A1 * | 3/2007 | Chenevert | A01D 34/005 |
| | | | 56/320.1 |
| 2009/0249764 A1 * | 10/2009 | Butler | A01D 34/005 |
| | | | 56/320.1 |
| 2012/0102906 A1 * | 5/2012 | Bedford | A01D 34/005 |
| | | | 56/320.2 |
| 2015/0359169 A1 * | 12/2015 | Weems | A01D 34/81 |
| | | | 56/14.7 |
| 2016/0360693 A1 * | 12/2016 | Ressler | A01D 42/005 |

FOREIGN PATENT DOCUMENTS

| | | | |
|---|---|---|---|
| GB | 966347 A | 8/1964 | |
| JP | S5782127 U | 5/1982 | |
| JP | S63045136 U | 3/1988 | |
| JP | S63143119 U | 9/1988 | |
| JP | S63143120 U | 9/1988 | |
| JP | S63186127 U | 11/1988 | |
| JP | S63186216 U | 11/1988 | |
| JP | S63193409 U | 12/1988 | |
| JP | S6410913 A | 1/1989 | |
| JP | S6411625 U | 1/1989 | |
| JP | S6424916 U | 2/1989 | |
| JP | S6449018 U | 3/1989 | |
| JP | H0160633 U | 4/1989 | |
| JP | H0555836 U | 7/1993 | |
| JP | H0614634 A | 1/1994 | |
| JP | H0614635 A | 1/1994 | |
| JP | H0646636 A | 2/1994 | |
| JP | H0646637 A | 2/1994 | |
| JP | H08214660 A | 8/1996 | |
| JP | H08242651 A | 9/1996 | |
| JP | H08280225 A | 10/1996 | |

(56) References Cited

FOREIGN PATENT DOCUMENTS

| JP | 2004041060 A | 2/2004 |
| WO | 9608955 A1 | 3/1996 |

OTHER PUBLICATIONS

Installation Instruction Sheet for Textron Baffle Kits Nos. 970238, 970239, 970240, dated Nov. 2001.
Instruction Sheet for Commercial Grounds Care, Inc. Baffle Kits Nos. 970281, 970282, 970283, dated Apr. 2003.
Instruction Sheet for Commercial Grounds Care, Inc. 61" Mulching Kit, dated Jul. 2005.
Exmark product brochure, dated 1993.
Exmark LazerZ brochure, dated 1995.
Exmark product brochure, dated 1995.
Toro Groundsmaster 200 Series brochure, dated 2001.
Toro Groundsmaster 300 Series brochure, dated 2001.
Toro Groundsmaster 580-D brochure, dated 2004.
Toro Z Master G3 brochure, dated 2008.
Husqvarna PZ6034FX brochure.
Photos of AGCO Mulcher and shredder kit and Country Clipper Jazee One Features.
Photo of Bad Boy mower deck retrieved from http://www.badboymowers.com on Jun. 10, 2010.
Encore service locator chart.
Dixie Chopper brochure.
Excel Hustler 3 Way Deck brochure.
Excel Hustler 275 brochure.
Excel Hustler Front-Mount Mower Specifications brochure.
Walker Mowers product line brochure, dated Jan. 1999.
Bunton Variable-Drive Walker brochure.
Kubota F2880/F3680 brochure.
Kubota F-Series (FRONT) Features brochure.
Features & Benefits Diagram of Xcaliber 74 mower deck.
Selected images from the Japanese Publication "Farming Mechanization," Jun. 1995.
Selected images from the Japanese Publication "Farming Mechanization," Sep. 1991.
Selected images from the Japanese Publication "Farming Mechanization," Jul. 1985.
Selected images from the Japanese publication "Farmers' Business".
Selected images from "The Nokishinbun," (Farm Machine News).
Selected images from the Japanese publication "Agricultural Marketing Journal," Mar. 1995.
John Deere, 1400/1500 Series II Product Brochure, 1 page.
John Deere 7-Iron II Product Brochure, 1 page.
John Deere Mulch on Demand Product Brochure, 1 page.
Exmark 48" Mulching Deck Retrofit Kit Instructions, Part #850177.
1994 Walker Talk Lawn Mower Publication.
Exmark LazerZ Lawn Mower Brochure.

* cited by examiner

BAFFLES FOR MOWER DECK

CROSS-REFERENCE TO RELATED APPLICATIONS

The present application is a divisional of U.S. patent application Ser. No. 16/171,713, filed Oct. 26, 2018, which claims the benefit of U.S. Provisional Patent Application No. 62/579,351, filed on Oct. 31, 2017, and titled "Baffles for Mower Deck," the entire contents of which are incorporated herein by reference in its entirety.

BACKGROUND OF THE INVENTION

Commercial-type lawn mowers, whether they are walk-behind or riding mowers, normally include a mower deck having multiple rotary cutting blades positioned therein. The mower deck can be classified either as a mulching deck, a side discharge deck, a rear discharge deck, or a bagging deck depending on the manner in which the grass cuttings, clippings, or discharge is handled or directed. When a mower is of the side discharge deck type, the grass clippings are discharged out of one side of the deck and onto the ground.

Side discharge mower decks, however, can be problematic when the grass clippings are not sufficiently discharged or directed to the side discharge opening of the mower deck. This can lead to clumping or aggregation of grass clippings on the ground and/or buildup of grass clippings on the underside of the mower deck. Further, when the mower moves over rough ground or otherwise moves away from the ground, side discharge decks allow clippings or cuttings to blow out from under the deck and into the operator. Front baffle assemblies were developed to create air gaps between the baffle and the front wall of side mower decks in order to limit blowout, but existing side discharge decks continue to permit blowout. In a conventional baffled deck, such as that shown in U.S. Pat. No. 5,845,475 ("475 patent"), the vacuum created by the rotating blades necessitates air flow below the bottom edges of the baffles and walls of the mower deck, because there are not gaps or air holes in the baffles or walls. Conventional mower decks require the air to flow below the walls and baffles and upwardly into the bays, which inhibits air flow from being directed immediately toward the discharge opening. Accordingly, there is still a need for a side discharge mower deck that can sufficiently direct and discharge grass clippings while also eliminating blowout onto the operator. It is also desirable to design, construct and implement a side discharge mower deck having multiple cutting blades, wherein the deck baffles are designed to efficiently direct the grass clippings to the discharge opening and direct far side grass clippings efficiently into adjacent cutting blades.

BRIEF SUMMARY OF THE INVENTION

Briefly stated, one aspect of the preferred invention is directed to a mower deck with gaps between baffles. The preferred mower deck includes a top deck, a forward sloped front wall extending from an edge of the top deck; a far side wall extending from an edge of the top deck and extending generally orthogonal from the forward sloped front wall; an exit side wall extending from an edge of the top deck disposed opposite of the far side wall and generally orthogonal to the forward sloped front wall; and a front baffle assembly, wherein the front baffle assembly extends between the far side wall and the exit side wall. The front baffle assembly includes a plurality of arcuate sections, the arcuate sections defining a plurality of gaps and a plurality of generally straight sections that direct grass clippings into adjacent cutting bays. The front baffle also includes gaps between portions of the baffle that allow air from between the front wall and the front baffle to direct grass clippings into adjacent cutting bays and/or out of the discharge opening.

In another aspect, the preferred invention is directed to a mower deck with gap baffles, comprising a top deck; a forward front wall extending from an edge of the top deck; a far side wall extending from an edge of the top deck and extending generally orthogonal from the forward front wall; an exit side wall extending from an edge of the top deck disposed opposite of the far side wall and generally orthogonal to the forward front wall; and a front baffle assembly, wherein the front baffle assembly extends between the far side wall and the exit side wall, wherein the front baffle assembly includes a plurality of arcuate sections, the arcuate sections defining a plurality of gaps.

Another aspect of the preferred invention is directed to a mower deck having multiple blade bays for cutting grass. The mower deck includes a top deck, a front wall extending downwardly from the top deck, a rear wall extending downwardly from the top deck, a first side wall extending downwardly from the top deck between the front wall and the rear wall, and a front baffle assembly extending downwardly from the top deck. The front baffle assembly extends from the first side wall toward a discharge side of the top deck. The front baffle assembly is configured to urge cut grass and debris toward the discharge opening. A discharge baffle is positioned proximate a rear end of the discharge opening and extends downwardly from the top deck. The discharge baffle and the rear wall define a discharge gap. The discharge gap is positioned on an opposite side of the discharge baffle from the discharge opening. The discharge gap is configured to allow airflow into the mower deck In a further aspect, the preferred invention is directed to a mower deck having multiple blade bays for cutting grass. The mower deck includes a top deck, a front wall extending downwardly from the top deck, a rear wall extending downwardly from the top deck, a first side wall extending downwardly from the top deck between the front wall and the rear wall, and a front baffle assembly extending downwardly from the top deck. The front baffle assembly extends from the first side wall toward a discharge side of the top deck. The front baffle assembly includes a first arcuate section extending from the first side wall and a first substantially straight section extending from the first arcuate section to a first exit end. The first arcuate section, the first straight section and the rear wall define a first bay. The front baffle assembly also includes a second arcuate section extending from a second entrance end. The second arcuate section and the rear wall defining a second bay. The first exit end is spaced from the second entrance end by a first gap.

Another aspect of the preferred invention is directed to a mower deck having multiple blade bays for cutting grass. The mower deck includes a top deck, a front wall extending downwardly from the top deck, a rear wall extending downwardly from the top deck and positioned opposite the front wall on the top deck, a first side wall extending downwardly from the top deck, a discharge opening positioned opposite the first side wall between the front wall and the rear wall, and a front baffle assembly extending from the first side wall toward the discharge opening. The first side wall is positioned between the front wall and the rear wall. The front baffle assembly includes a first front baffle section having a first entrance end and a first exit end and a second front baffle section having a second entrance end and a second exit end. The first exit end is spaced from the second entrance end by a first gap. The first front baffle section and the rear wall define a first bay and the second front baffle section and the rear wall defining a second bay. The first gap is configured to permit airflow therethrough into the second bay.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, preferred embodiments are shown in the drawings that are presently preferred. It should be understood, however, that the invention is not limited to the precise arrangements and instrumentalities shown. In the drawings.

DETAILED DESCRIPTION OF THE INVENTION

Figure 1:
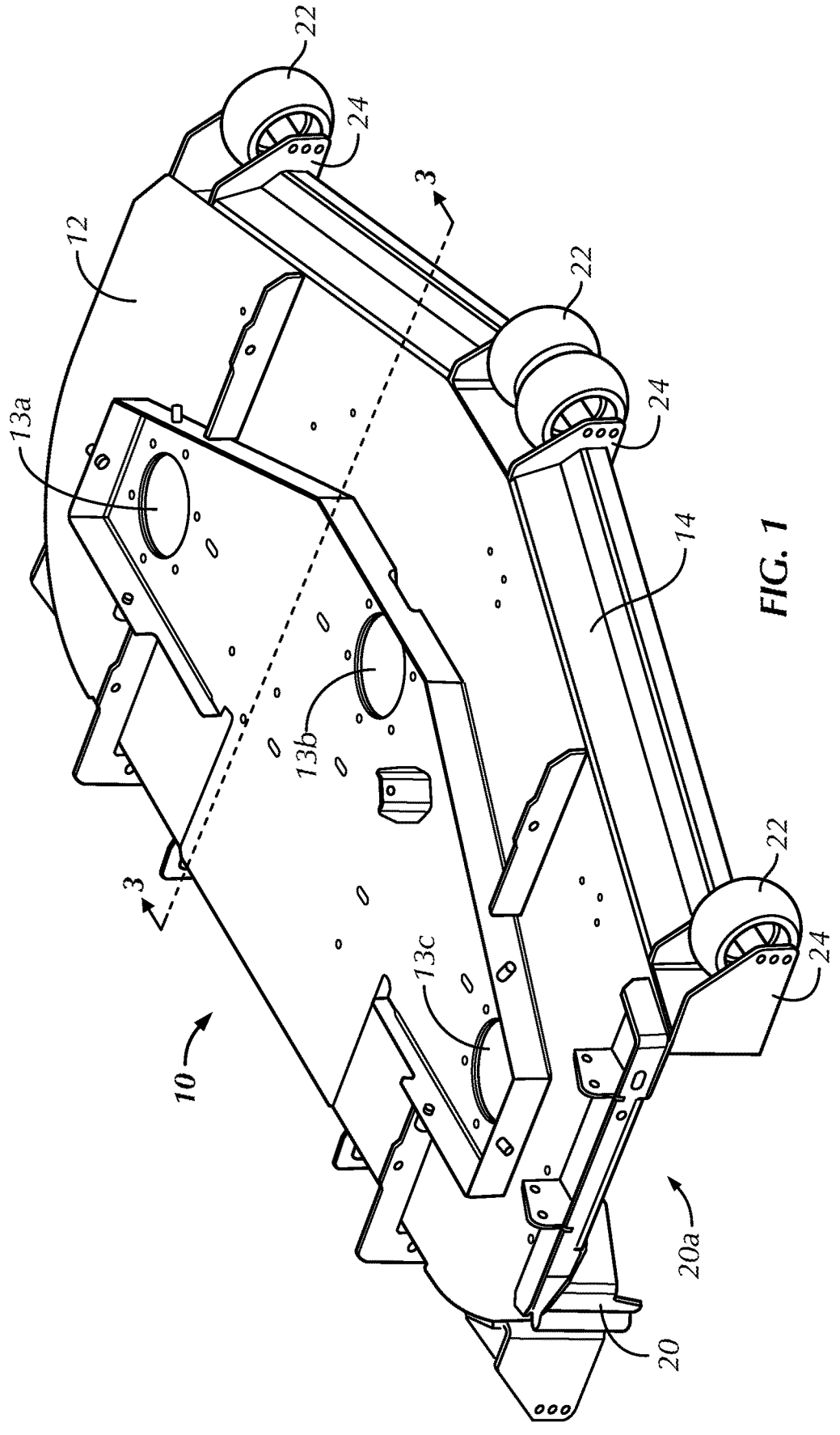
FIG. 1 is a top perspective view of a mower deck in accordance with a first preferred embodiment of the present invention.

Reference will now be made in detail to preferred embodiments of the invention illustrated in the accompanying drawings. Wherever possible, the same or like reference numerals will be used throughout the drawings to refer to the same or like features. In reference to the disclosure herein, for purposes of convenience and clarity only, directional terms such as top, bottom, above, below, and diagonal, are used with respect to the accompanying drawings. Such directional terms used in conjunction with the following description should not be construed to limit the scope of the invention in any manner not explicitly set forth. Unless specifically set forth herein, the terms "a," "an," and "the" are not limited to one element but instead should be read as meaning "at least one." The terminology includes the words noted above, derivatives thereof, and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
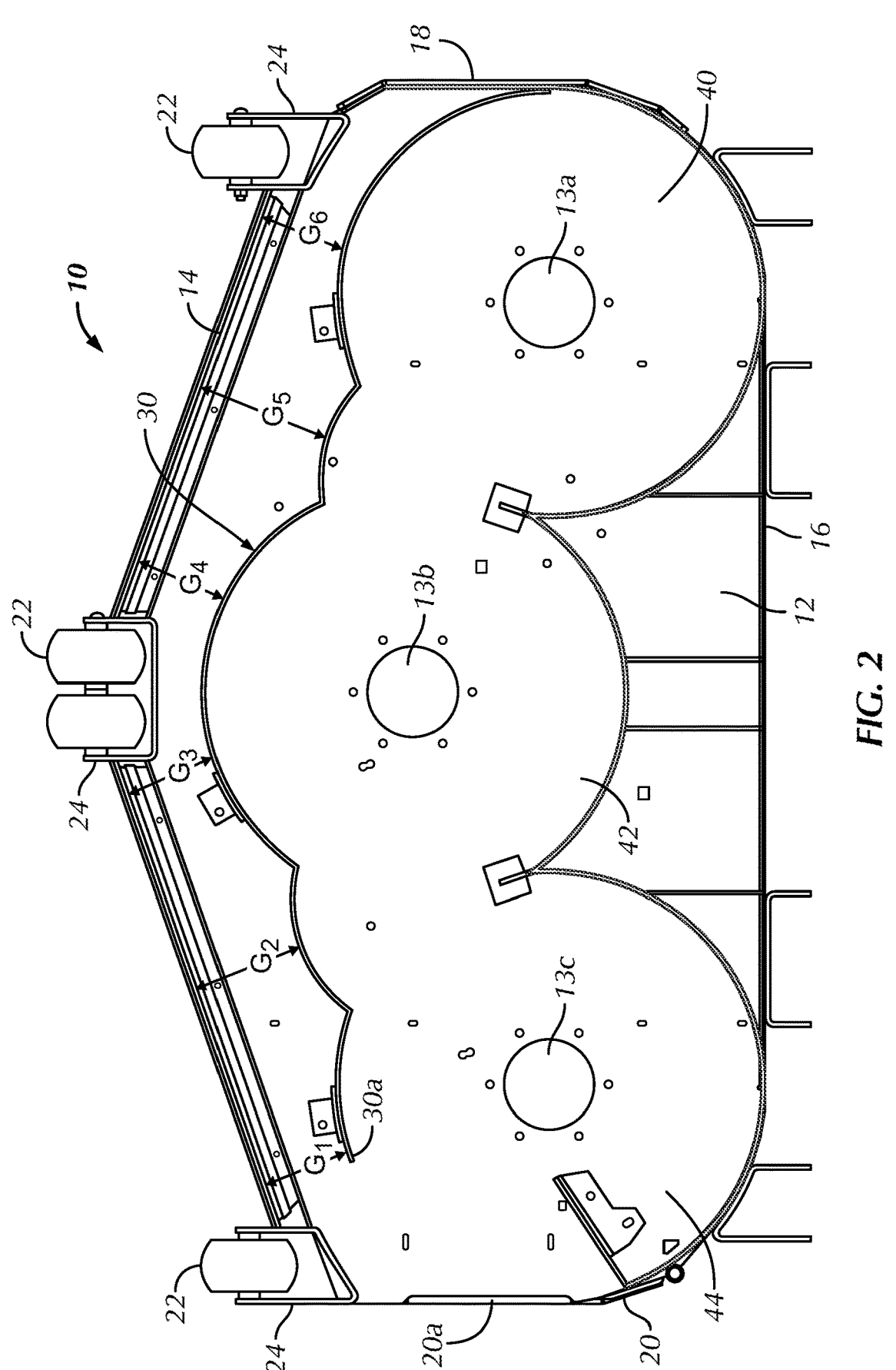
FIG. 2 is a bottom plan view of the mower deck of FIG. 1.
Figure 3:
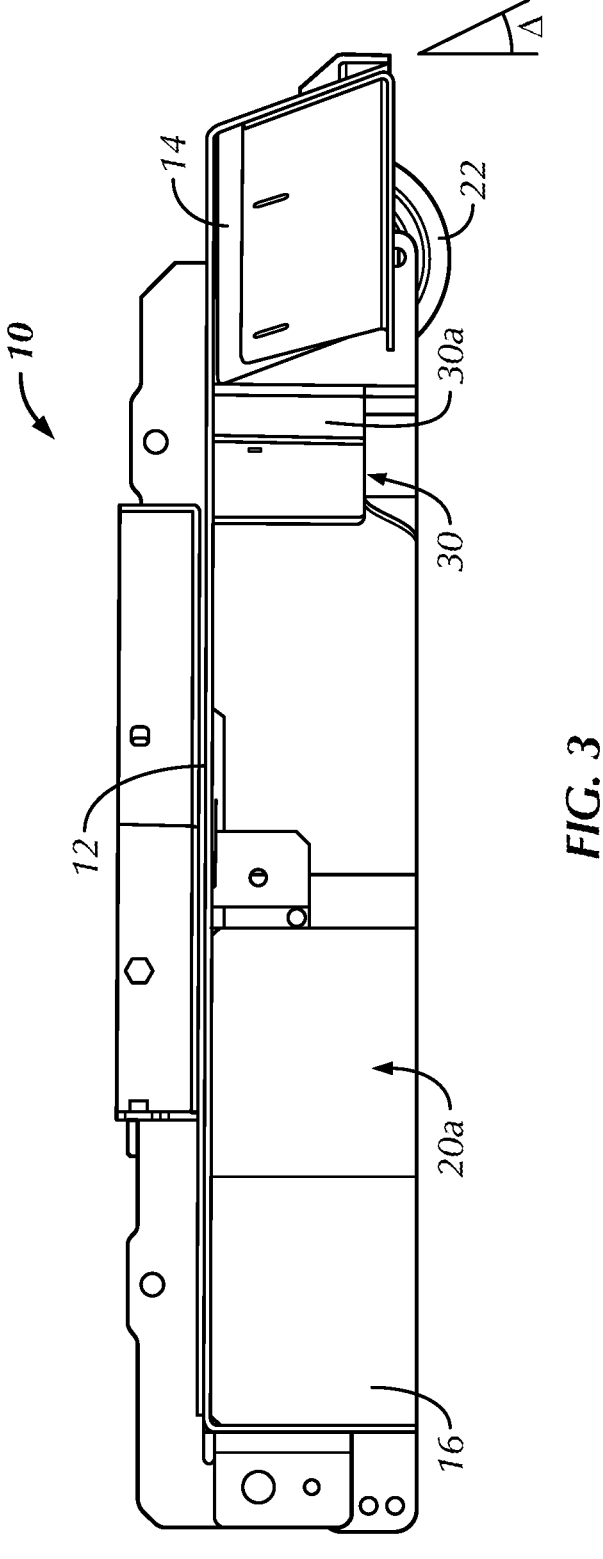
FIG. 3 is a discharge side elevational view of the mower deck of FIG. 1.

Referring to FIGS. 1-3, a first preferred embodiment of a mower deck 10 is shown that is driven or carried by a vehicle (not shown). The mower deck 10 includes a top deck 12, a front wall 14, a rear wall 16, a first side wall 18, and an exit wall 20. The deck 10 is selectively mountable to a vehicle. Three cutting blade assemblies (see FIGS. 7-9) with drive shafts (not shown) extend through holes 13a, 13b, 13c in the top deck 12. The cutting blades rotate within first, second, and third bays 40, 42, 44, respectively. The exit side wall 20 includes a discharge opening 20a that allows clippings and forced air to exit the cutting area below the top deck 12.

Referring specifically now to FIGS. 2 and 3, the mower deck 10 includes a front baffle assembly 30 extending under the top deck 12 to direct airflow and cuttings toward the discharge opening 20a. The front baffle assembly 30 partially defines the cutting bays 40, 42, 44 and is constructed of a series of arcuate sections extending between the first side wall 18 and a terminal end 30a of the front baffle assembly 30. The terminal end 30a is positioned proximate the third bay 44 and is spaced nearly half of a width of the third bay 44 away from the discharge opening 20a and the exit side wall 20. This spacing may vary depending on deck size and configuration. The front baffle assembly 30 is spaced at a variable gap $G_1$, $G_2$, $G_3$, $G_4$, $G_5$, $G_6$, $G_n$, from the front wall 14.

In the first preferred embodiment, the front wall 14 is preferably forwardly sloped at an acute angle A to increase the air gap created between the front baffle assembly 30 and the front wall 14, but may also extend downwardly, generally perpendicular relative to the top deck 12, slightly curved or angled toward the front baffle assembly 30 or otherwise configured. The front wall 14 may also include U-shaped joints 24 to accommodate wheels 22 for moving the mower deck 10 over the ground (see FIG. 4).

In operation, the cutting blades cut vegetation under the mower deck 10 as the deck 10 moves. Clippings cut by the blades in the first bay 40, second bay 42, and third bay 44 are guided toward the discharge opening 20a by the front baffle assembly 30 and a majority of the clippings flow toward the discharge opening 20a proximate an inside surface of the front baffle assembly 30. The spacing of the gaps $G_1$, $G_2$, $G_3$, $G_4$, $G_5$, $G_6$, $G_n$, improves airflow and therefore the vacuum and lift of the grass, providing for a higher quality cut than traditional side discharge decks.

Figure 4:
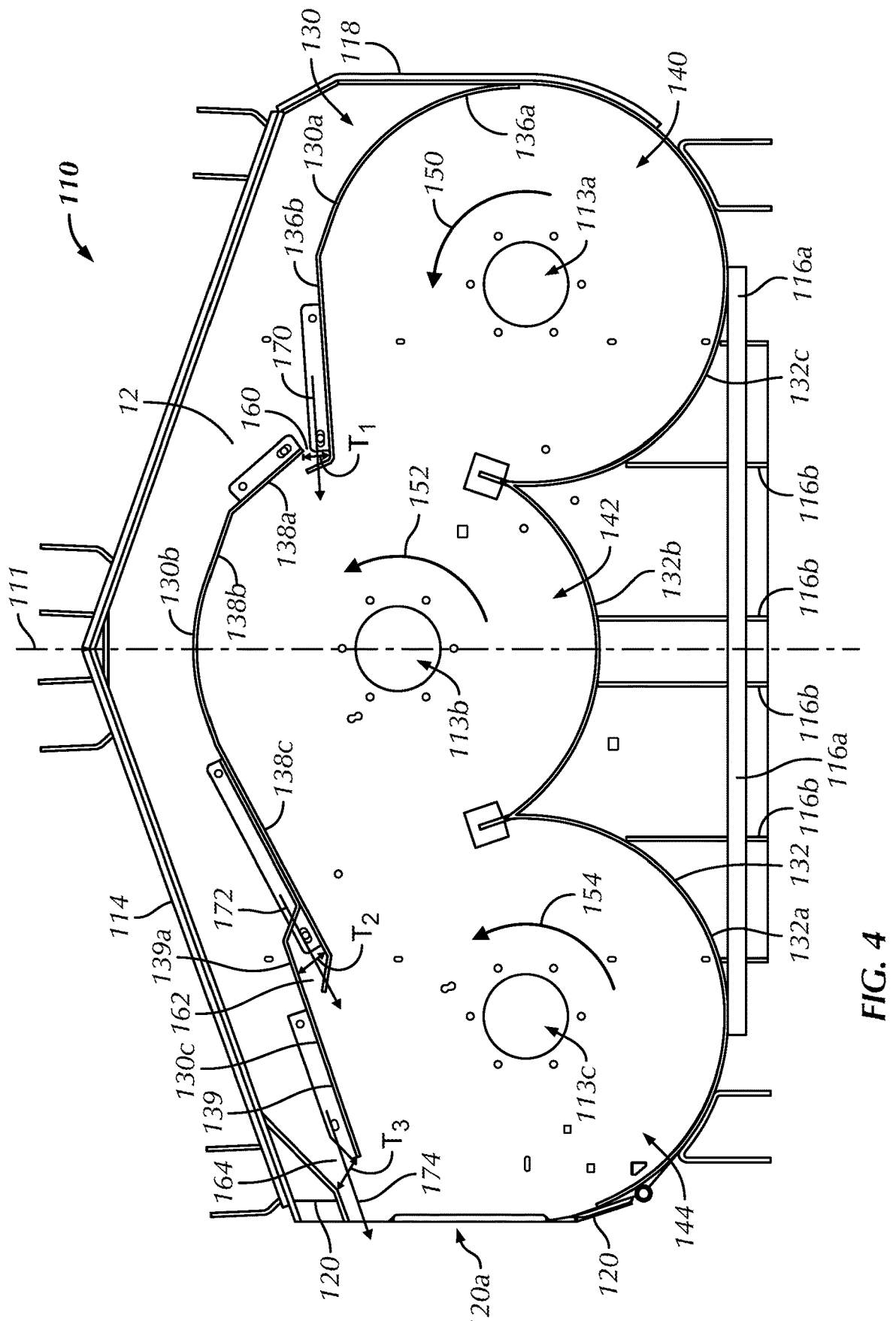
FIG. 4 is a bottom plan view of a mower deck in accordance with a second preferred embodiment of the present invention.
Figure 5:
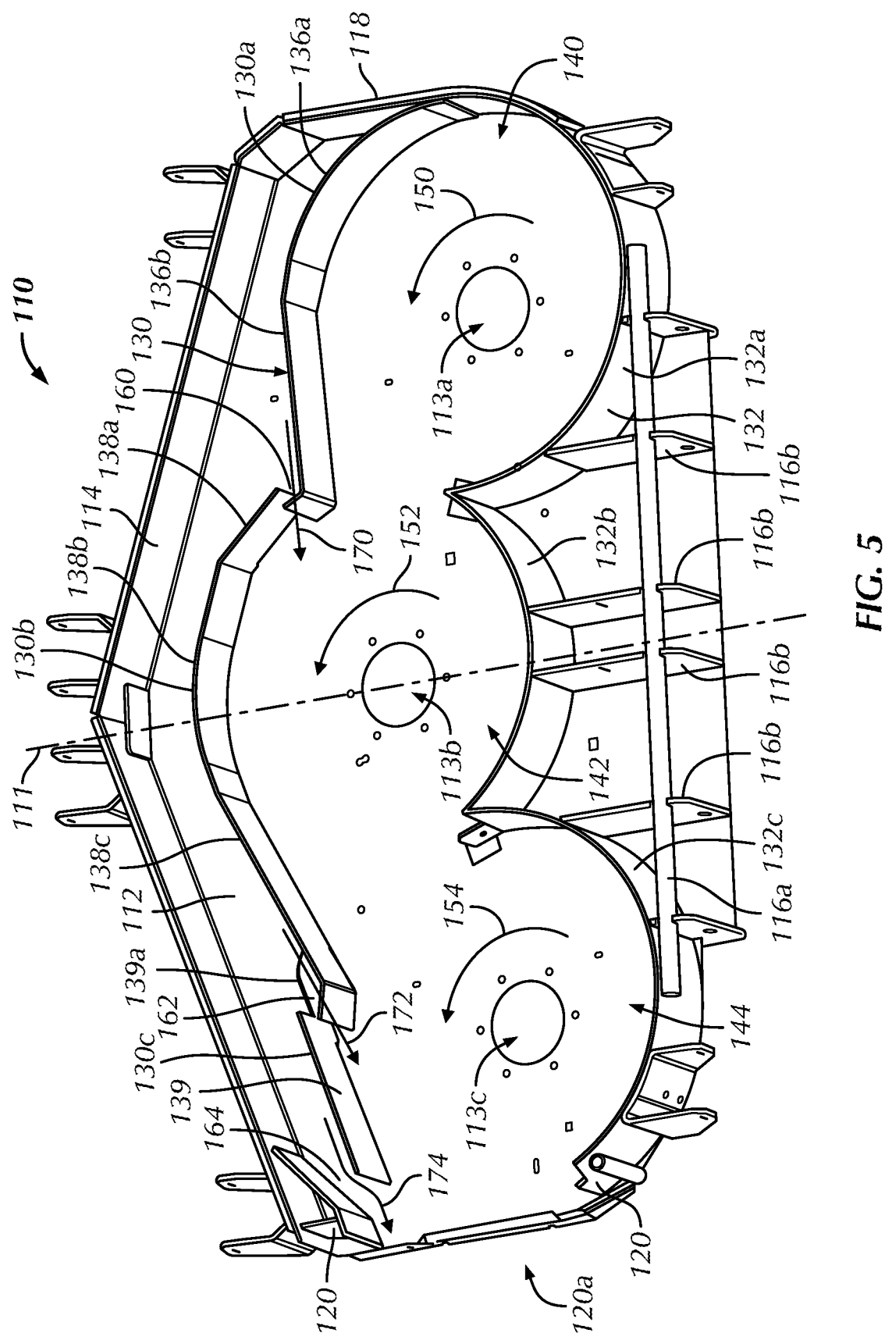
FIG. 5 is a bottom perspective view of the mower deck of FIG. 4.
Figure 6:
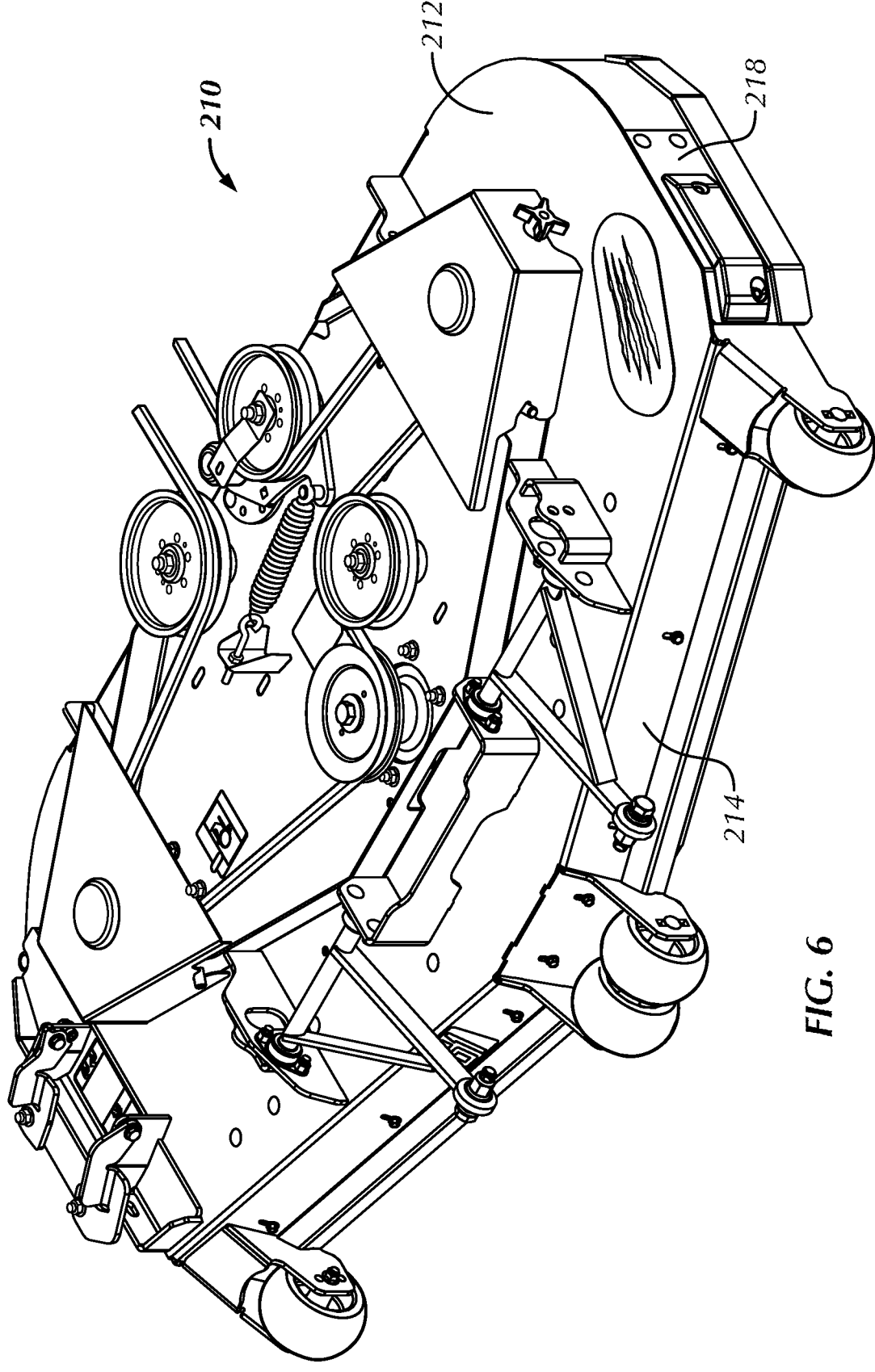
FIG. 6 is a top perspective view of a mower deck in accordance with a third preferred embodiment of the present invention.

Referring now to FIGS. 4 and 5, a second preferred embodiment of a mower deck, generally designated 110, is shown. Like reference numbers are utilized to identify like features of the second preferred mower deck 110 when compared to the first preferred mower deck 10, with a "1" prefix utilized to distinguish the features of the second preferred mower deck 110 from the features of the first preferred mower deck 10. The mower deck 110 is a vegetation mower deck that is mountable to and driven by a vehicle (not shown). The deck 110 includes a top deck 112, a front wall 114, a first side wall 118 and an exit side wall 120. The rear of the deck 110 may be selectively mountable to the vehicle and may include a lower support bar 116a and longitudinal support struts 116b that connect the support bar 116a and the top deck 112. The lower support bar 116a is oriented parallel to the top deck 112 and extends substantially perpendicular to a longitudinal axis 111 of the deck 110. The longitudinal support struts 116b extend perpendicular to the top deck 112 to support the top deck 112 and the support bar 116a. The longitudinal support struts 116b also extend substantially parallel to the longitudinal axis 111 between the rear end of the top deck 112 and a rear surface of a rear baffle assembly 132 (see FIG. 5). The lower support bar 116a and the longitudinal support struts 116b provide strength and rigidity for the rear of the deck 110, which preferably does not include a rear wall, but is not so limited, and may include a rear wall extending generally perpendicular to the longitudinal axis 111 to provide structural support to the mower deck 110. With the rear wall, the mower deck 110 may not include the support bar 116a and the longitudinal support struts 116b to supply rigidity and strength to the mower deck 110.

Three cutting blade assemblies (not shown) extend through holes 113a, 113b, 113c in the top deck 112. The cutting blades rotate within first, second and third bays 140, 142, 144 (FIGS. 4 and 5), respectively, and are mounted to shafts (not shown) that extend through the holes 113a, 113b, 113c. The exit side wall 120 includes a discharge opening 120a that allows clippings and forced air to exit the cutting area below the top deck 112. The discharge opening 120a is preferably covered by a safety flap (not shown) that is pivotably attached to the top deck 112 to block material from being propelled upwardly and out of the discharge opening 120a.

The mower deck 110 includes a front baffle assembly 130 extending downwardly from the underside of the top deck 112 to direct airflow and cuttings into the blades and toward the discharge opening 120a, respectively. The front baffle assembly 130 partially defines the cutting bays 140, 142, 144. The front baffle assembly 130 includes a first section 130a, a second section 130b and a third section 130c that extends from first side wall 118 toward the discharge opening 120a rearwardly relative to the front wall 114. The first section 130a includes a first arcuate portion 136a and a first straight portion 136b proximate the first bay 140, the second section 130b includes a second initial straight portion 138a, a second arcuate portion 138b and a second final straight portion 138c proximate the second bay 142 and the third section 130c includes a third straight portion 139 proximate the third bay 144. The front baffle assembly 130 guides the air and vegetation clippings from the first side wall 118 through the cutting bays 140, 142, 144 and toward the discharge opening 120a. The front baffle assembly 130 is preferably discontinuous. Specifically, the first straight portion 136b of the first section 130a is separated from and does not contact the second initial straight portion 138a of the second section 130b, leaving a first gap 160 between the first straight portion 136b and the second initial straight portion 138a between the first and second bays 140, 142. In addition, a second gap 162 is defined between the second final straight portion 138c of the second section 130b and the third straight portion 139 of the third section 130c, as well as a third gap 164 between the third straight portion 139 of the third section 130c and a front end of the discharge opening 120a. The gaps 160, 162, 164 permit air to directionally flow into the second and third bays 142, 144 and out of the discharge opening 120a, respectively, to urge the grass and vegetation clippings toward and out of the discharge opening 120a, as is described in greater detail below.

The cutting bays 140, 142, 144 are also partially defined by the arcuate rear baffle assembly 132 with a first rear baffle 132a proximate the first blade bay 140, a second rear baffle 132b proximate the second blade bay 142 and a third rear baffle 132c proximate the third blade bay 144. The arcuate rear baffle assembly 132 directs air and vegetation clippings upwardly around the blade bays 140, 142, 144 and into adjacent bays 140, 142, 144. The first rear baffle 132a and the first section 130a substantially define the first cutting bay 140, the second rear baffle 132b and the second section 130b substantially define the second cutting bay 142 and the third rear baffle 132c and the third section 130c substantially define the third cutting bay 144.

In operation, the cutting blades cut vegetation under the mower deck 110 as the deck 110 is urged along the ground by the vehicle. Clippings cut by the blade in the first bay 140 are guided around the first bay 140 in a first flow direction 150 by the first rear baffle 132a, the first arcuate portion 136a and the first straight portion 136b. The first straight portion 136b guides the air and clippings toward the second bay 142. In the second bay 142, the clippings and air are directed in a second flow direction 152 by the second rear baffle 132b, the second initial straight portion 138a, the second arcuate portion 136b and the second final straight portion 138c. The second final straight portion 138c guides the air and clippings toward the third bay 144. In the third bay 144, the third rear baffle 132c and the third straight portion 139 guide the air and clippings upwardly and around the third bay 144 in a third flow direction 154. The third straight portion 139 guides the air and clippings out of the discharge opening 120a. The air is driven by the rotating blades, which cut the vegetation and create a vacuum in the bays 140, 142, 144 to consistently draw air and vegetation upwardly and into the blades. The gaps 160, 162, 164 directionally draw air into the second and third bays 142, 144 to increase the velocity of the airflow toward the discharge opening 120a, thereby reducing clogging of the deck 110.

The gaps 160, 162, 164 result in significant and intentional discontinuities in the front baffle assembly 130 between an end at the first side wall 118 and an end spaced from the forward end of the discharge opening 120a. Specifically, the first gap 160 has a first gap width $T_1$ of approximately one and one-half inches (1½"), the second gap 162 has a second gap width $T_2$ of approximately two inches (2") and the third gap 164 between an end of the third straight portion 139 and the front end of the discharge opening 120a has a third gap width $T_3$ of approximately three and one-half inches (3½"). The gaps 160, 162, 164 and associated gap widths $T_1$, $T_2$, $T_3$ facilitate the directional flow of the air and cut vegetation toward the discharge opening 120a. The specifically identified sizes of the gap widths $T_1$, $T_2$, $T_3$ are preferred and may be larger or smaller, depending on deck size and other design preferences, such as being in the range of one-half inch to five inches (½"-5).

The gaps 160, 162, 164 of the front baffle assembly 130 of the deck 110 facilitate and direct air flow through the gaps 160, 162, 164 and directly toward the discharge opening 120a, guided by the shape and orientation of the gaps 160, 162, 164. The gaps 160, 162, 164 are specifically arranged and configured to channel the airflow into the second and third bays 142, 144 and out of the discharge openings 120 in airflow directions 170, 172, 174 substantially parallel to the first straight portion 136b, the second final straight portion 138c and the third straight portion 139, respectively. Accordingly, the configuration and orientation of the gaps 160, 162, 164 direct and funnel air flow toward the discharge opening 120a to facilitate discharge of the grass, air and vegetation clippings out of the discharge opening 120a and into the adjacent second and third bays 142, 144 for additional mulching. The gaps 160, 162, 164 increase airflow velocity and volume toward the discharge opening 120a to limit clogging of cut vegetation in the bays 140, 142, 144. The airflow directions 170, 172, 174 toward the discharge opening 120a improve performance of the deck 110 by reducing the possibility that the clippings jam within the bays 140, 142, 144 during operation. Specifically, the gaps 160, 162, 164 are arranged and configured to increase the velocity of airflow toward the discharge opening 120a and to reduce turbulence within the cutting bays to improve the cut and performance of the deck 110 when compared to conventional mower decks.

The third straight portion 139 includes an undercut portion 139a proximate the second final straight portion 138c that allows air to flow through the gap 162 and facilitates attachment of the third straight portion 139 to the second final straight portion 138c. The third straight portion 139 is fixed to the second final straight portion 138c by a fastener (not shown) at the end of the undercut portion 139a to provide strength and stiffness to the third straight portion 139.

Referring to FIGS. 6-10, a third preferred embodiment of a mower deck, generally designated 210, has a similar configuration and structure to the first and second preferred mower decks 10, 110. Like reference numbers are utilized to identify like features of the third preferred mower deck 210 when compared to the first preferred mower deck 10 and the second preferred mower deck 110, with a "2" prefix utilized to distinguish the features of the third preferred mower deck 210 from the features of the first and second preferred mower decks 10, 110. The mower deck 210 of the third preferred embodiment is a vegetation mower deck 210 that is mountable to and driven by a vehicle (not shown). The deck 210 includes a top deck 212, a front wall 214, a rear wall 216, a first side wall 218 and a discharge side 220. The rear of the deck 210 may be selectively mountable to the vehicle and includes longitudinal support struts 216b that connect to the top deck 212. The longitudinal support struts 216b extend perpendicular to the top deck 212 to support the top deck 212. The longitudinal support struts 216b also extend substantially parallel to the longitudinal axis 211 between the rear end of the top deck 212 and a rear surface of a rear baffle assembly 232 (see FIG. 7). The longitudinal support struts 216b provide strength and rigidity for the rear of the deck 210.

Three cutting blade assemblies (see FIG. 7) extend through holes in the top deck 212. The cutting blades 240a, 242a, 244a rotate within first, second and third bays 240, 242, 244 (FIGS. 7 and 8), respectively, and are mounted to shafts that extend through the holes. The discharge side 220 includes a discharge opening 220a that allows clippings and forced air to exit the cutting area below the top deck 212. The discharge opening 220a is preferably covered by a safety flap (not shown) that is pivotably attached to the top deck 212 to block material from being propelled upwardly and out of the discharge opening 220a.

The mower deck 210 includes a front baffle assembly 230 extending downwardly from the underside of the top deck 212 to direct airflow and cuttings into the blades 240a, 242a, 244a and toward the discharge opening 220a, respectively. The front baffle assembly 230 partially defines the cutting bays 240, 242, 244 and includes a first section 230a, a second section 230b and a third section 230c. The first section 230a includes a first arcuate section 236a extending from the first side wall 218 and a first substantially straight section 236b, proximate the first bay 240, and extending from the first arcuate section 236a towards a first exit end 236c. The first arcuate section 236a, the first straight section 236b, and the rear wall 216 define the first bay 240. The second section 230b includes a second arcuate section 238a extending from a second entrance end 238c, a second substantially straight section 238b extending from the second arcuate section 238a towards a second exit end 238d, the second entrance end 238c spaced from the first exit end 236c by a first gap 260. The second arcuate section 238a and the rear wall defining the second bay 242. The third section 230c includes a third substantially straight section 239a which includes a third entrance end 239b and a third exit end 239c, wherein the third entrance end 239b is spaced from the second exit end 238d by a second gap 262. The third exit end 239c is spaced from the discharge side 220 by a third gap 264. The front baffle assembly 230 guides the air and vegetation clippings from the first side wall 218 through the cutting bays 240, 242, 244 and toward the discharge opening 220a. The front baffle assembly 230 is preferably discontinuous and in this preferred embodiment, the gaps 260, 262, 264 are defined between the first section 230a and the second section 230b, the second section 230b and the third section 230c and the third section 230c and the discharge side 220. The gaps 260, 262, 264 permit air to directionally flow into the second and third bays 242, 244 and out of the discharge opening 220a, respectively, to urge the grass and vegetation clippings towards and out of the discharge opening 220a, as is described in greater detail below.

The cutting bays 240, 242, 244 are also partially defined by the arcuate rear baffle assembly 232 with a first rear arcuate section 232a proximate the first blade bay 240, a second rear arcuate section 232b proximate the second blade bay 242 and a third rear arcuate section 232c proximate the third blade bay 244. The arcuate rear baffle assembly 232 directs air and vegetation clippings upwardly around the blade bays 240, 242, 244 and into adjacent bays 240, 242, 244. The first bay 240 is substantially defined by the first section 230a and the first rear arcuate section 232a, the second bay 242 is substantially defined by the second section 230b and the second rear arcuate section 232b and the third bay 244 is substantially defined by the third section 230c and the third rear arcuate section 232c.

In operation, the cutting blades cut vegetation under the mower deck 210 as the deck 210 is urged along the ground by the vehicle. Clippings cut by the first blade 240a in the first bay 240 are guided around the first bay 240 in a first flow direction 250 by the first rear arcuate section 232a, the first arcuate portion 236a and the first straight portion 236b. The first straight portion 236b guides the air and clippings toward the second bay 242. In the second bay 242, the clippings and air are directed in a second flow direction 252 by the second rear arcuate section 232b, the second straight portion 238b, and the second arcuate portion 236a. The second straight portion 238b guides the air and clippings toward the third bay 244. In the third bay 244, the third rear arcuate section 232c and the third straight portion 239 guide the air and clippings upwardly and around the third bay 244 in a third flow direction 254. The third straight portion 239 guides the air and clippings out of the discharge opening 220a. The air is driven by the rotating blades 240a, 242a, 244a, which cut the vegetation and create a vacuum in the bays 240, 242, 244 to consistently draw air and vegetation upwardly and into the blades 240a, 242a, 244a. The gaps 260, 262, 264 directionally draw air into the second and third bays 242, 244 to increase the velocity of the airflow toward the discharge opening 220a, thereby reducing clogging of the deck 210.

Figure 7:
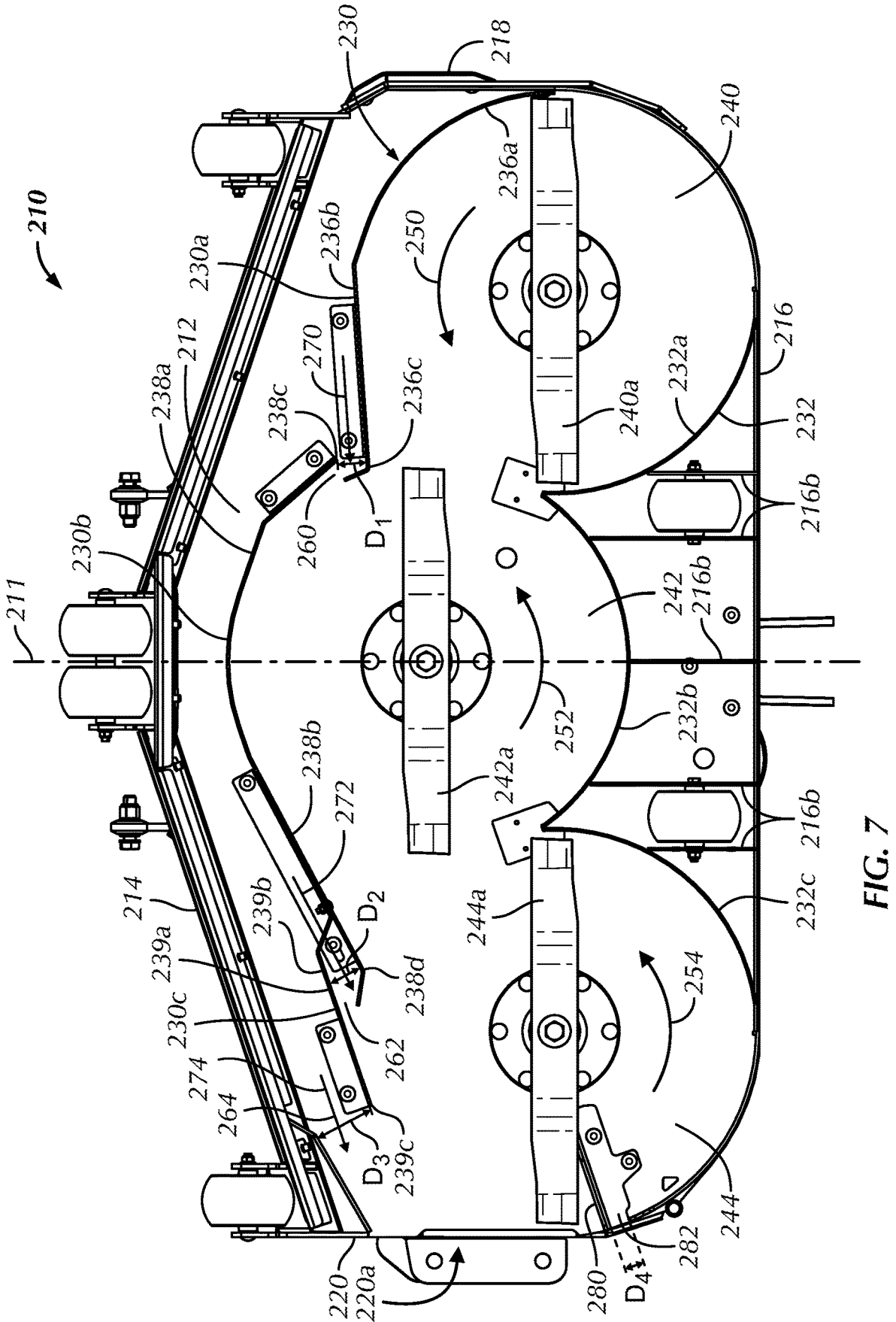
FIG. 7 is a bottom plan view of the mower deck of FIG. 6.

Referring to FIG. 7, the gaps 260, 262, 264 result in significant and intentional discontinuities in the front baffle assembly 230 between an end at the first side wall 218 and the third exit end 239c. Specifically, the first gap 260 has a first gap width $D_1$ of approximately one and one-half inches (1½"), the second gap 262 has a second gap width $D_2$ of approximately two inches (2") and the third gap 264 has a third gap width $D_3$ of approximately three and one-half inches (3½"). The gaps 260, 262, 264 and associated gap widths $D_1$, $D_2$, $D_3$ facilitate the directional flow of the air and cut vegetation toward the discharge opening 220a. The specifically identified sizes of the gap widths $D_1$, $D_2$, $D_3$ are preferred and may be larger or smaller, depending on deck size and other design preferences, such as being in the range of one-half inch to five inches (½"-5").

The gaps 260, 262, 264 of the front baffle assembly 230 of the deck 210 facilitate and direct flow of air through the gaps 260, 262, 264 and directly toward the discharge opening 220a, guided by the shape and orientation of the gaps 260, 262, 264. The gaps 260, 262, 264 are specifically arranged and configured to channel the airflow into the second and third bays 242, 244 and out of the discharge opening 220a in airflow directions 270, 272, 274 substantially parallel to the first straight portion 236b, the second straight portion 238b and the third straight portion 239a, respectively. Accordingly, the configuration and orientation of the gaps 260, 262, 264 direct and funnel air flow toward the discharge opening 220a to facilitate discharge of the grass and vegetation clippings out of the discharge opening 220a and into the adjacent second and third bays 242, 244 for additional mulching. The gaps 260, 262, 264 increase airflow velocity and volume toward the discharge opening 220a to limit clogging of cut vegetation in the bays 240, 242, 244. The airflow directions 270, 272, 274 toward the discharge opening 220a improve performance of the deck 210 by reducing the possibility that the clippings jam within the bays 240, 242, 244 during operation. Specifically, the gaps 260, 262, 264 are arranged and configured to increase the velocity of airflow toward the discharge opening 220a to improve the cut and performance of the deck 210 when compared to conventional mower decks.

Figure 8:
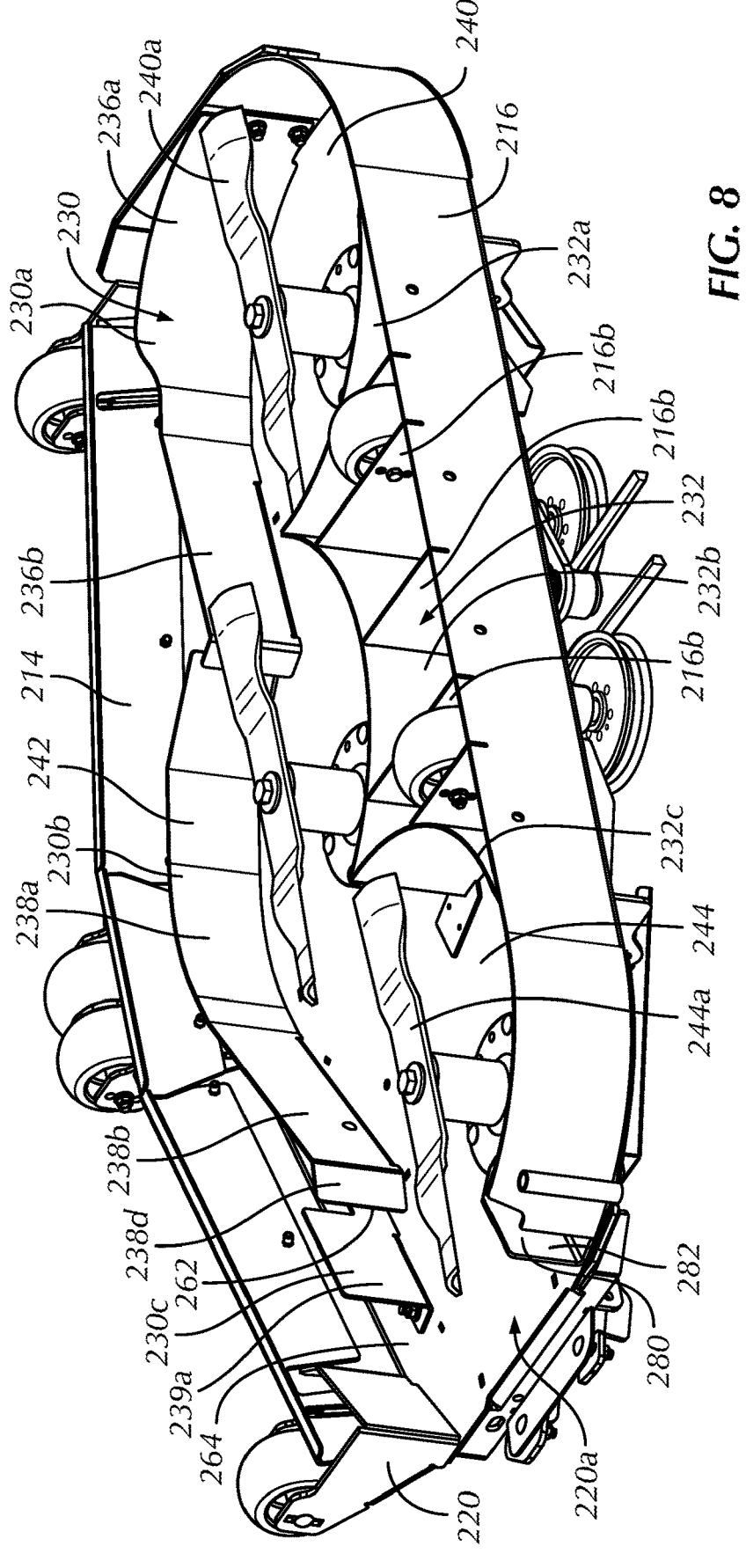
FIG. 8 is a bottom perspective view of the mower deck of FIG. 6.
Figure 9:
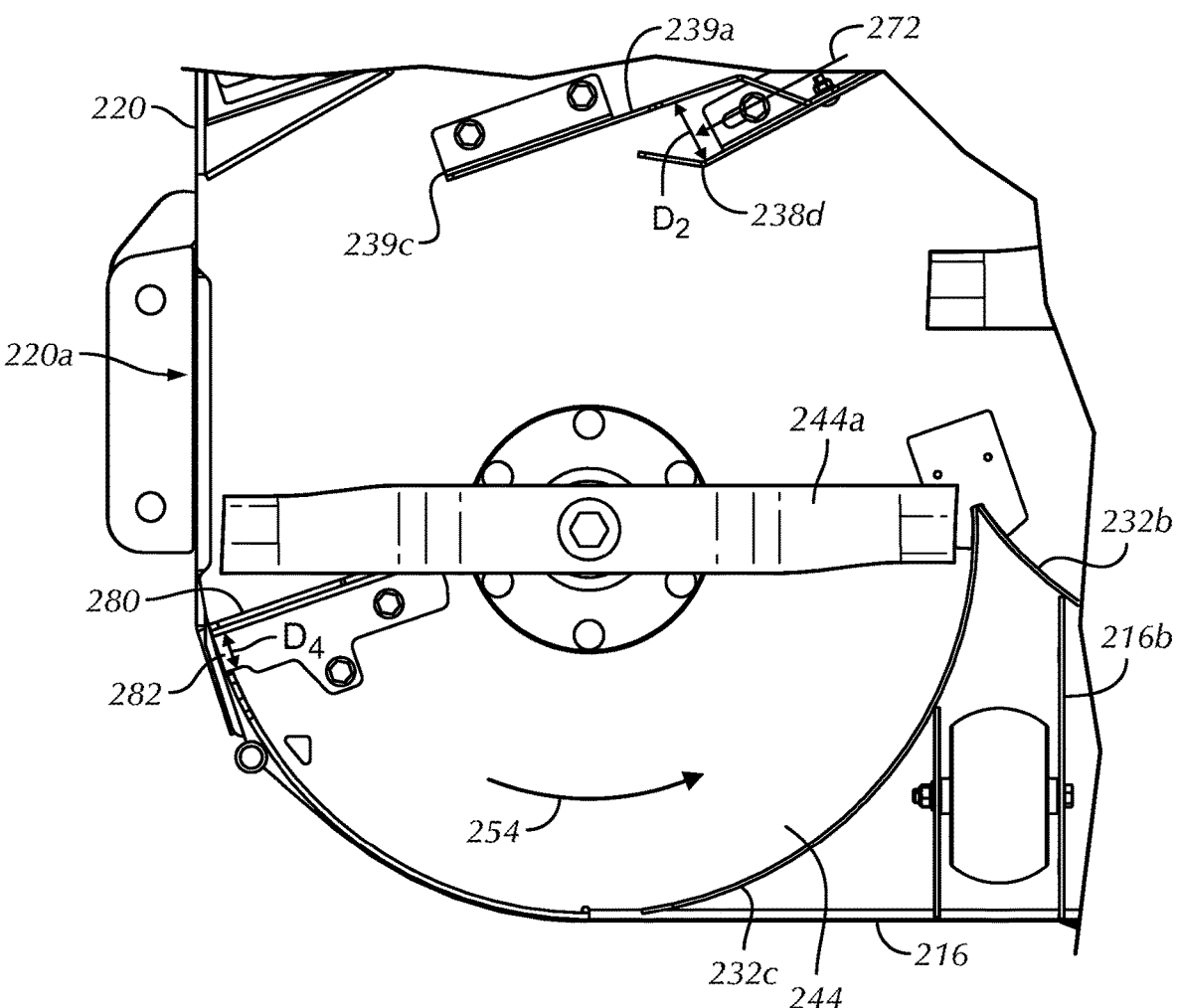
FIG. 9 is a bottom plan, magnified view of the mower deck of FIG. 6, taken near the discharge baffle.
Figure 10:
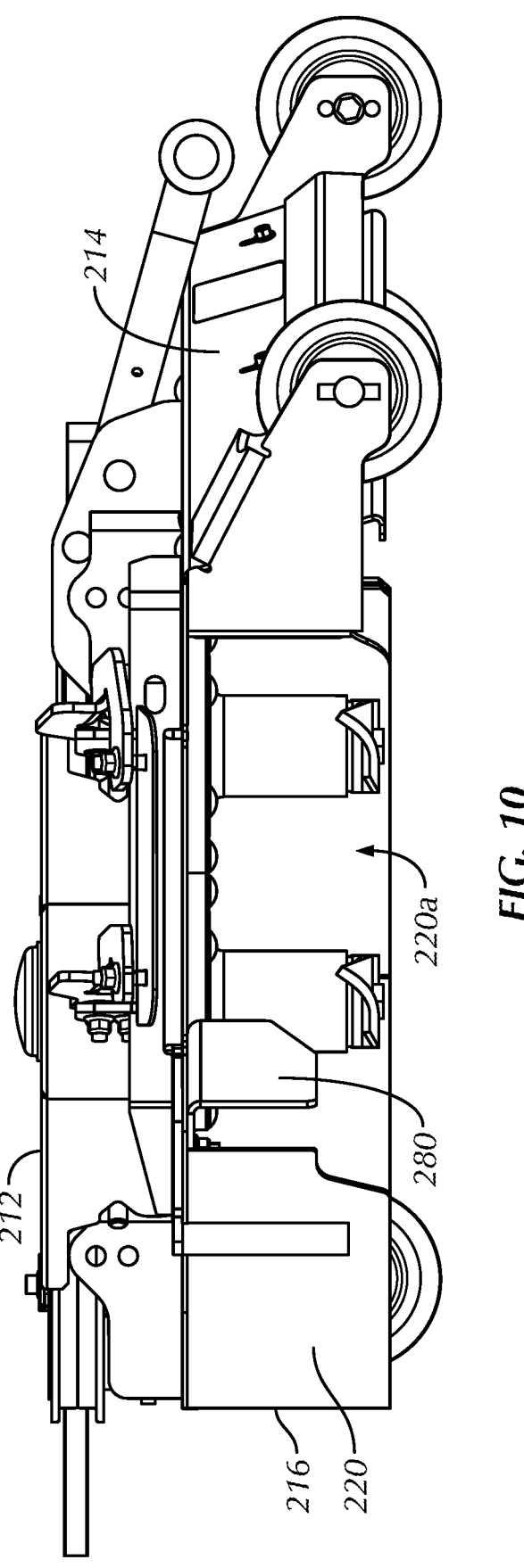
FIG. 10 is a discharge side elevational view of the mower deck of FIG. 7.

Referring to FIGS. 7-9, the mower deck 210 also includes a discharge baffle 280 located proximal to a rear end of the discharge opening 220a. The discharge baffle 280 is spaced apart from a rear baffle assembly 232 to form a discharge gap 282 with a discharge gap width $D_4$ between the discharge baffle 280 and rear baffle assembly 232. Accordingly, the configuration and orientation of discharge baffle 280 and discharge gap 282 direct and funnel air flow into third cutting bay 244 to facilitate discharge of the grass and vegetation clippings out of discharge opening 220a. The discharge gap 282 allows air to be drawn into the third cutting bay 244 in the general direction of the third airflow direction 254 within the third cutting bay 244 to limit clogging of vegetation in the bays 240, 242, 244. Specifically, the discharge gaps 282 is arranged and configured to increase the velocity of airflow toward the discharge opening 220a to improve the cut and performance of the deck 210 when compared to conventional mower decks.

The third straight portion 239a includes an undercut portion 239d proximate the second straight portion 238c that allows air to flow through the gap 262 and facilitates attachment of the third straight portion 239a to the second straight portion 238b. The third straight portion 239a is fixed to the second straight portion 238b by a fastener (not shown) at the end of the undercut portion 239d to provide strength and stiffness to the third straight portion 239a.

Referring to FIGS. 2, 4, 7 and 9, the front baffle assemblies 30, 130, 230 of the first, second and third preferred embodiments of the mower decks 10, 110, 210 are removably mountable to the top deck 12, 112, 212. The removable mounting of the front baffle assemblies 30, 130, 230 facilitate servicing of the front baffle assemblies 30, 130, 230 if the front baffle assemblies 30, 130, 230 become damaged during use or if the user wants to modify the configuration of the front baffle assemblies 30, 130, 230. The front baffle assemblies 30, 130, 230 are preferably bolted to the top deck 12, 112, 212 such that the assemblies 30, 130, 230 can be removed and replaced when damaged or for a configuration change or individual ones of the first, second and third sections 130a, 130b, 130c, 230a, 230b, 230c of the second and third preferred front baffle assemblies 130, 230 can be removed and replaced. The preferred front baffle assemblies 30, 130, 230 are not limited to being bolted to the top deck 12, 112, 212 and may be bonded, clamped, screwed or otherwise removably secured to the top deck 12, 112, 212, as long as the front baffle assemblies 30, 130, 230 are securely attached to the top decks 12, 112, 212 in the mounted configuration and otherwise perform the preferred functions of the front baffle assemblies 30, 130, 230. The front baffle assemblies 30, 130, 230 may also be fixed or permanently secured to the top decks 12, 112, 212 by welding, bonding, integrally forming or molding or otherwise fixing the front baffle assemblies 30, 130, 230 to the top decks 12, 112, 212.

The front baffle assemblies 130, 230 of the second and third preferred embodiments with the gaps 160, 162, 164, 260, 262, 264 and designed and configured to utilize the natural action of the blades 240a, 242a, 244a to direct and accelerate the airflow within the bays 140, 142, 144, 240, 242, 244. The air that is expelled out of the second and third preferred discharge openings 120a, 220a originally comes from outside the perimeter of the mower decks 110, 210 and is drawn under the mower decks 110, 210 by the lift of the blades 240a, 242a, 244a. When all of this air is forced to come under a downwardly extending baffle, such as in prior art decks, the flow of air under the baffles creates turbulence that can lead to unpredictable air flow and difficulty with discharge of cut grass and debris. The gaps 160, 162, 164, 260, 262, 264 of the second and third preferred embodiments allow the air coming into the area between the front wall 114, 214 and the front baffle assemblies 130, 230 to flow through the gaps 160, 162, 164, 260, 262, 264 and for channeling in the direction of the discharge openings 120a, 220a, thereby reducing turbulence and creating a vector of directional airflow toward the discharge openings 120a, 220a. The vector or direction of airflow created by the gaps 160, 162, 164, 260, 262, 264 can be manipulated by the shapes of the first, second and third sections 130a, 130b, 130c, 230a, 230b, 230c, which can be modified by removing and replacing the front baffle assemblies 130, 230 or the individual sections 130a, 130b, 130c, 230a, 230b, 230c, based on designer or user preferences.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A mower deck having multiple blade bays for cutting grass, the mower deck comprising:
    a top deck;
    a front wall extending downwardly from the top deck;

a rear wall extending downwardly from the top deck opposite the front wall;

a first side wall extending downwardly from the top deck, the first side wall extending between the front wall and the rear wall;

a side opening defined between the front wall and the rear wall and opposite the first side wall;

a discharge baffle extending downwardly from the top deck, the discharge baffle partitioning the side opening into a discharge opening between the front wall and the discharge baffle and a discharge gap between the discharge baffle and the rear wall, the discharge gap being configured to allow airflow into the mower deck; and a front baffle assembly extending downwardly from the top deck, the front baffle assembly extending from the first side wall toward the discharge opening, the front baffle assembly configured to urge cut grass and debris toward the discharge opening.

2. The mower deck of claim 1, wherein the front wall extends downwardly at an acute angle from the top deck.

3. The mower deck of claim 1, wherein the rear wall includes a rear baffle assembly, the rear baffle assembly includes a plurality of rear arcuate sections extending downwardly from the top deck.

4. The mower deck of claim 3, wherein the rear baffle assembly includes a first rear arcuate section, a second rear arcuate section and a third rear arcuate section, the first rear arcuate section associated with a first bay and a first blade, the second rear arcuate section associated with a second bay and a second blade, the third rear arcuate section associated with a third bay and a third blade.

5. The mower deck of claim 3, wherein the front and rear baffle assemblies define a first bay and a second bay.

6. The mower deck of claim 5, wherein the first bay, the second bay, and a third bay are disposed between the first side wall and the discharge opening.

7. The mower deck of claim 6, wherein the first bay is associated with a first blade, the second bay is associated with a second blade and the third bay is associated with a third blade.

8. The mower deck of claim 1, wherein the front baffle assembly is one of bolted and welded to the top deck.

9. The mower deck of claim 1, wherein the discharge baffle extends to the side opening to partition the discharge opening from the discharge gap.

* * * * *